United States Patent
Jiang et al.

(10) Patent No.: US 12,009,513 B2
(45) Date of Patent: Jun. 11, 2024

(54) LITHIUM-ION BATTERY ANODE MATERIAL AND PREPARATION METHOD THEREOF, ANODE, AND LITHIUM-ION BATTERY

(71) Applicant: BYD COMPANY LIMITED, Shenzhen (CN)

(72) Inventors: Zhengfu Jiang, Shenzhen (CN); Shicai Li, Shenzhen (CN); Xiaopeng Jiao, Shenzhen (CN); Yongqing Gan, Shenzhen (CN); Xiao Shi, Shenzhen (CN)

(73) Assignee: BYD COMPANY LIMITED, Shenzhen (CN)

(*) Notice: Subject to any disclaimer, the term of this patent is extended or adjusted under 35 U.S.C. 154(b) by 749 days.

(21) Appl. No.: 17/255,188

(22) PCT Filed: Jun. 19, 2019

(86) PCT No.: PCT/CN2019/091902
§ 371 (c)(1),
(2) Date: Dec. 22, 2020

(87) PCT Pub. No.: WO2019/242647
PCT Pub. Date: Dec. 26, 2019

(65) Prior Publication Data
US 2021/0280860 A1    Sep. 9, 2021

(30) Foreign Application Priority Data
Jun. 22, 2018 (CN) .................. 201810654565.X (51) Int. Cl.
*H01M 4/38* (2006.01)
*H01M 4/134* (2010.01)
(Continued)

(52) U.S. Cl.
CPC .......... *H01M 4/386* (2013.01); *H01M 4/134* (2013.01); *H01M 4/366* (2013.01); *H01M 4/382* (2013.01);
(Continued)

(58) Field of Classification Search
CPC ...... H01M 4/386; H01M 4/134; H01M 4/366; H01M 4/382; H01M 4/625; H01M 10/0525
See application file for complete search history.

(56) References Cited

U.S. PATENT DOCUMENTS

| | | | |
|---|---|---|---|
| 2016/0211511 A1* | 7/2016 | Ren | H01M 4/386 |
| 2017/0324097 A1* | 11/2017 | Lee | H01M 10/4235 |
| 2019/0260020 A1* | 8/2019 | Yamamoto | H01M 10/0525 |

FOREIGN PATENT DOCUMENTS

| | | |
|---|---|---|
| CN | 102185142 A | 9/2011 |
| CN | 102683639 A | 9/2012 |

(Continued)

OTHER PUBLICATIONS

CN 106558692 MT (Year: 2017).*
(Continued)

*Primary Examiner* — Alexander Usyatinsky
(74) *Attorney, Agent, or Firm* — Wenye Tan (57) ABSTRACT

An anode material includes a core-shell structured composite material. The core-shell structured composite material includes a core material, an inner shell material, and an outer shell material. The core material includes graphite particles. The inner shell material includes a continuous phase and a dispersing phase. The dispersing phase includes nano silicon particles, the continuous phase includes carbon, and the outer shell material includes lithium metal. A chemical formula of the nano silicon-based particles is SiOx, 0<x<2.

10 Claims, 2 Drawing Sheets

(51) Int. Cl.
    *H01M 4/36* (2006.01)
    *H01M 4/62* (2006.01)
    *H01M 10/0525* (2010.01)
(52) U.S. Cl.
    CPC ....... *H01M 4/625* (2013.01); *H01M 10/0525* (2013.01)

(56) References Cited

FOREIGN PATENT DOCUMENTS

| | | | |
|---|---|---|---|
| CN | 103022446 | A | 4/2013 |
| CN | 103346305 | A | 10/2013 |
| CN | 103560233 | A | 2/2014 |
| CN | 103633306 | A | 3/2014 |
| CN | 105932224 | A | 9/2016 |
| CN | 106058228 | A | 10/2016 |
| CN | 106558692 | * | 4/2017 |
| CN | 106558692 | A | 4/2017 |
| CN | 107359309 | A | 11/2017 |
| CN | 107464926 | A | 12/2017 |
| WO | WO 2018088248 | * | 5/2017 |
| WO | 2018088248 | A1 | 5/2018 |

OTHER PUBLICATIONS

The decision of SIPO to grant a Patent (Year: 2021).*
The World Intellectual Property Organization (WIPO) International Search Report for PCT/CN2019/091902 dated Sep. 6, 2019 5 Pages.

* cited by examiner

FIG. 1

FIG. 2

LITHIUM-ION BATTERY ANODE MATERIAL AND PREPARATION METHOD THEREOF, ANODE, AND LITHIUM-ION BATTERY

CROSS-REFERENCE TO RELATED APPLICATIONS

This application is a national phase entry under 35 U.S.C. § 371 of International Application No. PCT/CN2019/091902, filed on Jun. 19, 2019, which claims priority to Chinese Patent Application No 201810654565.X filed by the BYD Co., Ltd. on Jun. 22, 2018, and entitled LITHIUM-ION BATTERY ANODE MATERIAL AND PREPARATION METHOD THEREFOR, ANODE, AND LITHIUM-ION BATTERY, the entire content of all of which is incorporated herein by reference in its entirety.

FIELD

The present disclosure relates to the technical field of lithium-ion batteries, and in particular, to a lithium-ion battery anode material and preparation method thereof, an anode, and a lithium-ion battery.

BACKGROUND

To increase the specific capacity of anode materials of lithium-ion batteries, often, silicon is added to anode materials as an additive. However, the volume expansion effect of silicon, when used as the anode material, can cause pulverization of the anode material, expansion of the anode, significant reduction of electrode capacity, and poor cycle performance of the battery.

SUMMARY

An objective of the present disclosure is to provide a lithium-ion battery anode material, which has a high volume energy density and resolves the problem of volume expansion resulting from the direct addition of silicon in the anode material.

A first aspect of the present disclosure provides a lithium-ion battery anode material, including a core-shell structured composite material. The core-shell structured composite material comprises a core material, an inner shell material, and an outer shell material, the core material is graphite particles, the inner shell material comprises a continuous phase and a dispersing phase, the dispersing phase comprises nano silicon particles, the continuous phase comprises carbon, and the outer shell material comprises lithium metal.

A second aspect of the present disclosure provides a method for preparing a lithium-ion battery anode material, including the following steps: S1, performing first ball-milling of nano silicon and a carbon source material, then adding graphite and performing second ball-milling to obtain a ball-milled mixture; S2, sintering the ball-milled mixture under an inert gas atmosphere to obtain a silicon-carbon material; and S3, depositing lithium metal on the surface of the silicon-carbon material to obtain the anode material.

A third aspect of the present disclosure provides a lithium-ion battery anode material prepared by the method according to the second aspect of the present disclosure.

A fourth aspect of the present disclosure provides a lithium-ion battery anode, comprising the lithium-ion battery anode material according to the first aspect or the third aspect of the present disclosure.

A fifth aspect of the present disclosure provides a lithium-ion battery, comprising the lithium-ion battery anode according to the fourth aspect of the present disclosure.

Through the above technical solutions, the lithium-ion battery anode material of the present disclosure has a core-shell structure, and a layer of lithium metal is uniformly deposited on the surface of the core material as a shell material, which can provide uniform active sites for electrochemical deposition of lithium metal during the charging process of the anode material, to avoid the problem of dendrite formation caused by nonuniform electrochemical deposition of lithium metal. Secondly, due to the presence of lithium metal on the surface, silicon can form a shallow charge and shallow discharge state during the subsequent cycles after being fully intercalated with lithium for the first time, thereby effectively improving the cycle performance of the battery. In addition, the inner shell of the anode material contains uniformly dispersed nano silicon particles coated on the surface of the graphite particles, which can increase the specific capacity of the anode material and avoid the problem of volume expansion. Through the reasonable design of the core-shell structure and the proportions of the materials, the volume energy density of the composite material can exceed the volume energy density of 2061 mAh/cm3 of metal lithium, thereby greatly improving the volume energy density of the battery.

Some of the additional aspects and advantages of the present disclosure will be provided in the description below, some of which may be apparent from the following description or understood through practice of the disclosure.

BRIEF DESCRIPTION OF THE DRAWINGS

The above additional aspects and advantages of the present disclosure become apparent and comprehensible from the description of embodiments in connection with accompanying drawings.

DETAILED DESCRIPTION

Embodiments of the present disclosure will be exemplarily described in detail hereinafter with reference to accompanying drawings in which the same or like reference characters refer to the same or like elements or elements having the same or like functions throughout. The embodiments described below with reference to the accompanying drawings are exemplary, and are intended to explain the present disclosure, rather than limiting the present disclosure.

Endpoints of a range and any value disclosed in this specification should not be limited to a precise range or value. The range or value should be understood as a value close to the range or value. For the value range, endpoint values of the ranges, or endpoint values of the ranges and independent point values, or independent point values may be combined with each other to form one or more new value ranges, and these value ranges shall be regarded as being specifically disclosed in this specification.

A first aspect of the present disclosure provides a lithium-ion battery anode material, comprising a core-shell structured composite material. The core-shell structured composite material comprises a core material, an inner shell material, and an outer shell material. The core material is graphite particles, the inner shell material comprises a continuous phase and a dispersing phase, the dispersing phase comprises nano silicon-based particles, the continuous phase comprises carbon, the outer shell material comprises lithium metal, and the chemical formula of the nano silicon-based particles is SiOx, where 0<x<2.

It is found that when an anode active material having a core-shell structure where the core includes lithium-silicon alloy particles and the shell is a carbon layer is used, the structure can effectively alleviate the volume expansion effect of silicon used as the anode. This material structure may indeed have the function described above for anode materials with low specific capacity. However, when the specific capacity reaches 600 mAh/g or more, because the volume expansion of silicon is at least 400%, not only the expansion of lithium is 100%, but also the density of lithium is very low, which is 0.534 g/cm3. When the amount of lithium reaches a certain level, its absolute volume expansion is also surprisingly high. The shell structure is carbon material, the expansion of which is limited. As a result, when the space provided by the shell structure is sufficient for the volume expansion of the core, the material will be broken. Therefore, when the specific capacity is higher than 600 mAh/g, this structure is not suitable for use as the anode material. In this case, this structure still cannot resolve the cycle and other problems caused by volume expansion.

In view of this, the present disclosure provides a lithium-ion battery anode material. The anode material has a core-shell structure, and a layer of lithium metal is uniformly deposited on the surface of the core material as a shell material. When the anode material is applied in a lithium-ion battery, lithium metal in the anode material is in contact with the electrolytic solution to form a short circuit, so that the outer shell material (lithium metal) is all intercalated in at least one of the inner shell material and the core material, and multiple paths formed by the intercalation of lithium metal are used for subsequent intercalation of lithium in the cathode material, that is, uniform active sites can be provided for electrochemical deposition of lithium metal during the charging process of the anode material, to avoid the problem of dendrite formation caused by nonuniform electrochemical deposition of lithium metal. Secondly, due to the presence of lithium metal on the surface, silicon can form a shallow charge and shallow discharge state during the subsequent cycles after being fully intercalated with lithium for the first time, thereby effectively improving the cycle performance of the battery. In addition, the inner shell of the anode material contains uniformly dispersed nano silicon particles coated on the surface of the graphite, which can increase the specific capacity of the anode material and avoid the problem of volume expansion. Through the reasonable design of the core-shell structure and the proportions of the materials, the volume energy density of the composite material can exceed the volume energy density of 2061 mAh/cm3 of metal lithium, thereby greatly improving the volume energy density of the battery.

According to the present disclosure, the meanings of the continuous phase and the dispersing phase are known to those skilled in the art as: in the inner shell material, carbon wraps nano silicon particles, the wrapped nano silicon particles form a discontinuous dispersing phase, and carbon forms a continuous phase.

According to the present disclosure, the dimensions of the parts of the core-shell structured composite material may vary in a large range. In some embodiments, the average particle size of the graphite particles may be 5-25 μm, for example, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, or 25 μm. In some other embodiments, the average particle size of the graphite particles may be 15-20 μm. In still some other embodiments, the average particle size of the nano silicon particles may be 10-100 nm, for example, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, or 100 nm. In yet still some other embodiments, the average particle size of the nano silicon particles may be 30-50 nm. In the particle size range in the above embodiments, the nano silicon particles can be distributed more uniformly, and fixed to the surface of the graphite particles by carbon coating. The average particle size may be obtained by calculating the average value of particle sizes of any 100 particles of the material in an SEM image at a magnification of 200,000,000 times.

According to the present disclosure, the average particle size of the core-shell structured composite material may vary in a large range. In some embodiments, the average particle size may be 5.6-32 μm, for example, 5.6 μm, 6 μm, 6.5 μm, 7 μm, 7.5 μm, 8 μm, 8.5 μm, 9 μm, 9.5 μm, 10 μm, 10.5 μm, 11 μm, 11.5 μm, 12 μm, 12.5 μm, 13 μm, 13.5 μm, 14 μm, 14.5 μm, 15 μm, 15.5 μm, 16 μm, 16.5 μm, 17 μm, 17.5 μm, 18 μm, 18.5 μm, 19 μm, 19.5 μm, 20 μm, 20.5 μm, 21 μm, 21.5 μm, 22 μm, 22.5 μm, 23 μm, 23.5 μm, 24 μm, 24.5 μm, 25 μm, 25.5 μm, 26 μm, 26.5 μm, 27 μm, 27.5 μm, 28 μm, 28.5 μm, 29 μm, 29.5 μm, 30 μm, 30.5 μm, 31 μm, 31.5 μm, or 32 μm, so as to improve the electrochemical performance of the anode material. The average particle size of the core-shell structured composite material may be obtained by calculating the average value of particle sizes of any 100 particles of the core-shell structured composite material observed using an electron microscopy.

According to the present disclosure, the thicknesses of the inner shell and the outer shell of the core-shell structured composite material may also respectively vary in a large range. In some embodiments, the thickness of the inner shell of the core-shell structured composite material may be 0.5-2 μm, for example, 0.5 μm, 0.6 μm, 0.7 μm, 0.8 μm, 0.9 μm, 1.0 μm, 1.1 μm, 1.2 μm, 1.3 μm, 1.4 μm, 1.5 μm, 1.6 μm, 1.7 μm, 1.8 μm, 1.9 μm, or 2 μm. In some other embodiments, the thickness of the inner shell of the core-shell structured composite material may be 1-1.5 μm, so that the nano silicon particles and the core material, i.e., the graphite particles, are fully uniformly bonded, to avoid the volume expansion effect while increasing the specific capacity of the anode material. Further, the thickness of the outer shell of the core-shell structured composite material may be 0.1-5 μm, for example, 0.1 μm, 0.2 μm, 0.3 μm, 0.4 μm, 0.5 μm, 0.6 μm, 0.7 μm, 0.8 μm, 0.9 μm, 1.0 μm, 1.1 μm, 1.2 μm, 1.3 μm, 1.4 μm, 1.5 μm, 1.6 μm, 1.7 μm, 1.8 μm, 1.9 μm, 2 μm, 2.1 μm, 2.2 μm, 2.3 μm, 2.4 μm, 2.5 μm, 2.6 μm, 2.7 μm, 2.8 μm, 2.9 μm, 3.0 μm, 3.1 μm, 3.2 μm, 3.3 μm, 3.4 μm, 3.5 μm, 3.6 μm, 3.7 μm, 3.8 μm, 3.9 μm, 4 μm, 4.1 μm, 4.2 μm, 4.3 μm, 4.4 μm, 4.5 μm, 4.6 μm, 4.7 μm, 4.8 μm, 4.9 μm, or 5 μm. Further, the thickness of the outer shell of the core-shell structured composite material may be 1-2 μm, so as to improve the cycle performance of the battery. The thickness of the outer shell is the thickness of lithium metal deposited, and the thickness of the inner shell is the thickness of the carbon source and nano silicon particles coated on the graphite surface after being carbonized. In this application, the thickness of the outer shell and the thickness of the inner shell may be respectively obtained by cutting the core-shell structured composite material by metallography and then observing the thickness of the outer shell and the thickness of the inner shell of the particles using an electron microscopy.

According to the present disclosure, the relative contents of the graphite particles, the nano silicon particles, and carbon may respectively vary in a large range. In some embodiments, the weight ratio of the graphite particles to the nano silicon particles may be 1:(0.02-0.2), for example, 1:0.02, 1:0.03, 1:0.04, 1:0.05, 1:0.06, 1:0.07, 1:0.08, 1:0.09, 1:0.1, 1:0.11, 1:0.12, 1:0.13, 1:0.14, 1:0.15, 1:0.16, 1:0.17, 1:0.18, 1:0.19, or 1:0.2. In some other embodiments, the weight ratio of the graphite particles to the nano silicon particles may be 1:(0.1-0.15). Further, the weight ratio of the graphite particles to carbon may be 1:(0.03-0.3), for example, 1:0.03, 1:0.04, 1:0.05, 1:0.06, 1:0.07, 1:0.08, 1:0.09, 1:0.1, 1:0.11, 1:0.12, 1:0.13, 1:0.14, 1:0.15, 1:0.16, 1:0.17, 1:0.18, 1:0.19, 1:0.2, 1:0.21, 1:0.22, 1:0.23, 1:0.24, 1:0.25, 1:0.26, 1:0.27, 1:0.28, 1:0.29, or 1:0.3. Further, the weight ratio of the graphite particles to carbon may be 1:(0.1-0.15). In the content ranges in the above embodiments, the nano silicon particles in the anode material can be more uniformly coated and fixed to the surface of the graphite particles, so that on one hand, the impact caused by the difference between the electrical performance of the two can be reduced to provide silicon-carbon material particles containing a graphite core with uniform and stable performance, and on the other hand, more suitable content ranges can increase the specific capacity of the anode material, thereby optimizing the performance of the battery.

According to the present disclosure, the relative amount of lithium metal in the anode material may also vary in a large range. In some embodiments, the weight ratio of the graphite particles to lithium metal may be 1:(0.01-0.2), for example, 1:0.01, 1:0.02, 1:0.03, 1:0.04, 1:0.05, 1:0.06, 1:0.07, 1:0.08, 1:0.09, 1:0.1, 1:0.11, 1:0.12, 1:0.13, 1:0.14, 1:0.15, 1:0.16, 1:0.17, 1:0.18, 1:0.19, or 1:0.2. In some other embodiments, the weight ratio of the graphite particles to lithium metal may be 1:(0.05-0.1), so as to provide a suitable number of active sites for electrochemical deposition of lithium metal, and facilitate formation of a shallow charge and shallow discharge state, thereby effectively improving the cycle performance of the battery.

According to the present disclosure, the continuous phase in the inner shell material can be used for uniformly dispersing and fixing the nano silicon particles, i.e., the dispersing phase, to the surface of the graphite particles, so as to improve the electrochemical performance of the anode material. To facilitate the preparation and uniform dispersion of the nano silicon particles, in an implementation of the present disclosure, carbon in the inner shell material may be pyrolytic carbon.

According to the present disclosure, to prevent lithium metal from being exposed directly to the surface of the anode material and lower the strict requirements on production conditions (for example, on moisture) caused by the presence of lithium metal, the surface of the outer shell material of the core-shell structured composite material may further be coated with an inert material layer. The inert material layer may include at least one of $Al_2O_3$, LiF, $Li_3PO_4$, $TiO_2$, $Li_3N$ or $LiNO_3$.

A second aspect of the present disclosure provides a method for preparing a lithium-ion battery anode material, including the following steps: S1, performing first ball-milling of nano silicon particles and a carbon source material, then adding graphite and performing second ball-milling to obtain a ball-milled mixture; S2, sintering the ball-milled mixture under an inert gas atmosphere to obtain a silicon-carbon material; and S3, depositing lithium metal on the surface of the silicon-carbon material to obtain the anode material.

The method of the present disclosure is easy to implement and highly repeatable and can make use of the existing graphite processes, and the anode material prepared by the method can have a high volume energy density and good electrochemical performance.

According to the present disclosure, by performing the first ball-milling of the nano silicon particles and the carbon source material, then adding graphite and performing the second ball-milling, the nano silicon particles can be uniformly dispersed in the carbon source material, and can further be coated on the graphite surface by means of sintered carbon. To achieve a more uniform dispersion of the nano silicon particles and the graphite, conditions of the first ball-milling may include: a rotating speed of 150-600 r/min, for example, 150 r/min, 160 r/min, 170 r/min, 180 r/min, 190 r/min, 200 r/min, 210 r/min, 220 r/min, 230 r/min, 240 r/min, 250 r/min, 260 r/min, 270 r/min, 280 r/min, 290 r/min, 300 r/min, 310 r/min, 320 r/min, 330 r/min, 340 r/min, 350 r/min, 360 r/min, 370 r/min, 380 r/min, 390 r/min, 400 r/min, 410 r/min, 420 r/min, 430 r/min, 440 r/min, 450 r/min, 460 r/min, 470 r/min, 480 r/min, 490 r/min, 500 r/min, 510 r/min, 520 r/min, 530 r/min, 540 r/min, 550 r/min, 560 r/min, 570 r/min, 580 r/min, 590 r/min, or 600 r/min. In some other embodiments, the rotating speed of the first ball-milling is 300-400 r/min. Further, the time of the first ball-milling may be 12-60 h, for example, 12 h, 13 h, 14 h, 15 h, 16 h, 17 h, 18 h, 19 h, 20 h, 21 h, 22 h, 23 h, 24 h, 25 h, 26 h, 27 h, 28 h, 29 h, 30 h, 31 h, 32 h, 33 h, 34 h, 35 h, 36 h, 37 h, 38 h, 39 h, 40 h, 41 h, 42 h, 43 h, 44 h, 45 h, 46 h, 47 h, 48 h, 49 h, 50 h, 51 h, 52 h, 53 h, 54 h, 55 h, 56 h, 57 h, 58 h, 59 h, or 60 h. In yet still other embodiments, the time of the first ball-milling may be 15-30 h. Conditions of the second ball-milling include: a rotating speed of 150-400 r/min, for example, 150 r/min, 160 r/min, 170 r/min, 180 r/min, 190 r/min, 200 r/min, 210 r/min, 220 r/min, 230 r/min, 240 r/min, 250 r/min, 260 r/min, 270 r/min, 280 r/min, 290 r/min, 300 r/min, 310 r/min, 320 r/min, 330 r/min, 340 r/min, 350 r/min, 360 r/min, 370 r/min, 380 r/min, 390 r/min, or 400 r/min. In some other embodiments, the rotating speed of the second ball-milling is 200-350 r/min. Further, the time of the second ball-milling may be 3-18 h, for example, 3 h, 4 h, 5 h, 6 h, 7 h, 8 h, 9 h, 10 h, 11 h, 12 h, 13 h, 14 h, 15 h, 16 h, 17 h, or 18 h. Further, the time of the second ball-milling is 6-12 h.

According to the present disclosure, conditions of the sintering may be conventionally known in the art. In some embodiments, the conditions of the sintering include: a sintering temperature of 600-1000° C., for example, 600° C., 650° C., 700° C., 750° C., 800° C., 850° C., 900° C., 950° C., or 1000° C. In some other embodiments, the sintering temperature is 800-980° C. Further, the sintering time may be 5-20 h, for example, 5 h, 6 h, 7 h, 8 h, 9 h, 10 h, 11 h, 12 h, 13 h, 14 h, 15 h, 16 h, 17 h, 18 h, 19 h, or 20 h. Further, the sintering time is 8-12 h, so as to fully carbonize the carbon source and obtain a more uniformly coated inner shell material on the surface of the graphite particles.

According to the present disclosure, the sintered silicon-carbon material may be formed into granular powder. The granular silicon-carbon material may include a graphite particle core and a silicon-carbon shell coated on the surface of the graphite particle core. Nano silicon particles are distributed in the silicon-carbon shell to form a dispersing phase. After being sintered, the carbon-coated nano silicon particles form a continuous phase and are coated on the surface of the graphite particles.

In some embodiments, the method of depositing on the surface of the silicon-carbon material is one of vacuum evaporation deposition, atomic deposition, or magnetron sputtering. In some other embodiments, the method of depositing on the surface of the silicon-carbon material is vacuum evaporation deposition. As is well known to those skilled in the art, vacuum evaporation deposition is a method of heating an elemental metal to its evaporation temperature by vacuum and then allowing the metal vapor to condense on the surface of a low temperature material. The use of the vacuum evaporation deposition method can avoid the agglomeration of lithium metal on the surface of the granular silicon-carbon material and improve the uniformity of electrochemical deposition of lithium metal. The vacuum evaporation deposition method can also accurately control the amount of metal lithium to be deposited and the deposit thickness. According to the present disclosure, the carbon source material can be used for allowing the nano silicon particles to be uniformly dispersed and to be evenly distributed and coated on the surface of the graphite particles after sintering. The carbon source material may be of a type conventionally known in the art, for example, an organic matter. The carbon source material may be a liquid or solid carbon source material. In some embodiments, to facilitate the uniform dispersion of the nano silicon particles, the carbon source material is at least one selected from the group consisting of pitch, glucose, sucrose, citric acid and epoxy resin.

According to the present disclosure, the amounts of the graphite particles, the nano silicon particles, and carbon may respectively vary in a large range. To improve the specific capacity and the cycle performance of the anode material, in some embodiments, the weight ratio of the graphite particles to the nano silicon particles may be 1:(0.02-0.2), for example, 1:0.02, 1:0.03, 1:0.04, 1:0.05, 1:0.06, 1:0.07, 1:0.08, 1:0.09, 1:0.1, 1:0.11, 1:0.12, 1:0.13, 1:0.14, 1:0.15, 1:0.16, 1:0.17, 1:0.18, 1:0.19, or 1:0.2. In some other embodiments, the weight ratio of the graphite particles to the nano silicon particles may be 1:(0.1-0.15). Further, the weight ratio of the graphite particles to the carbon source material may be 1:(0.03-0.5), for example, 1:0.03, 1:0.04, 1:0.05, 1:0.06, 1:0.07, 1:0.08, 1:0.09, 1:0.1, 1:0.11, 1:0.12, 1:0.13, 1:0.14, 1:0.15, 1:0.16, 1:0.17, 1:0.18, 1:0.19, 1:0.2, 1:0.21, 1:0.22, 1:0.23, 1:0.24, 1:0.25, 1:0.26, 1:0.27, 1:0.28, 1:0.29, 1:0.3, 1:0.31, 1:0.32, 1:0.33, 1:0.34, 1:0.35, 1:0.36, 1:0.37, 1:0.38, 1:0.39, 1:0.4, 1:0.41, 1:0.42, 1:0.43, 1:0.44, 1:0.45, 1:0.46, 1:0.47, 1:0.48, 1:0.49, 1:0.5, 1:0.51, 1:0.52, 1:0.53, 1:0.54, 1:0.55, 1:0.56, 1:0.57, 1:0.58, 1:0.59, or 1:0.6. Further, the weight ratio of the graphite particles to the carbon source material may be 1:(0.06-0.5). Further, the weight ratio of the graphite particles to the carbon source material may be 1:(0.1-0.15).

According to the present disclosure, the amount of lithium metal in the anode material may also vary in a large range. In some embodiments, the weight ratio of the graphite particles to lithium metal may be 1:(0.01-0.2), for example, 1:0.01, 1:0.02, 1:0.03, 1:0.04, 1:0.05, 1:0.06, 1:0.07, 1:0.08, 1:0.09, 1:0.1, 1:0.11, 1:0.12, 1:0.13, 1:0.14, 1:0.15, 1:0.16, 1:0.17, 1:0.18, 1:0.19, or 1:0.2. In some other embodiments, the weight ratio of the graphite particles to lithium metal may be 1:(0.05-0.1), so as to provide a suitable number of active sites for electrochemical deposition of lithium metal, and facilitate the formation of a shallow charge and shallow discharge state, thereby effectively improving the cycle performance of the battery.

According to the present disclosure, this method may further include a step of forming an inert material layer on the surface of the lithium metal outer shell, so as to lower the strict requirements on production conditions (for example, on moisture) caused by the presence of lithium metal. The inert material layer may include at least one of $Al_2O_3$, LiF, $Li_3PO_4$, $TiO_2$, $Li_3N$ or $LiNO_3$. The inert material layer may be formed by one of atomic deposition, chemical deposition, vacuum evaporation deposition, or magnetron sputtering, so that the inert material layer is evenly coated on the surface of the lithium metal outer shell. In some embodiments, the inert material layer is formed by atomic deposition. The atomic deposition method is a technique of alternately introducing vapor phase precursor pulses into a reactor followed by chemical adsorption and reaction on the deposition substrate to form a deposited film.

A third aspect of the present disclosure provides a lithium-ion battery anode material prepared by the method according to the second aspect of the present disclosure.

A fourth aspect of the present disclosure provides a lithium-ion battery anode, comprising the lithium-ion battery anode material according to the first aspect or the third aspect of the present disclosure.

According to the present disclosure, the lithium-ion battery may further include an anode current collector, and the anode material may be loaded on the anode current collector. The anode current collector may be a conventional anode current collector in lithium-ion batteries, for example, a stamped metal, metal foil, mesh metal, or foam metal. The anode material may further include a binder, which may be of a type conventionally known in the art, so the details will not be repeated.

The method for preparing a lithium-ion battery anode according to the present disclosure has no special requirements and can be carried out with reference to the prior art. For example, the method for preparing a lithium-ion battery anode according to the present disclosure may include forming an anode slurry containing an anode material and a binder on the anode current collector, followed by drying and optionally calendering. The anode slurry may be formed on the anode current collector by at least one of coating or filling. The specific operation method and conditions may be conventionally known in the art, and are not particularly limited herein.

A fifth aspect of the present disclosure provides a lithium-ion battery, comprising the lithium-ion battery anode according to the fourth aspect of the present disclosure.

According to the present disclosure, the lithium-ion battery may further include a cathode, a separator, and an electrolytic solution. The present disclosure imposes no special limitations on the types of the cathode, the separator, and the electrolytic solution, which may be conventionally known in the art. The lithium-ion battery may also be prepared using a conventional method in the art. For example, the lithium-ion battery provided by the present disclosure can be obtained by winding and separating a cathode and the above anode of the present disclosure by a separator to form an electrode group and sealing the obtained electrode group and an electrolytic solution in a battery case. The method of winding the separator between the cathode and the anode is well known to those skilled in the art, so the details will not be repeated herein.

The composition of the cathode is well known to those skilled in the art. Generally speaking, the cathode includes a cathode current collector and a cathode material formed on the cathode current collector. The cathode material formed on the cathode current collector may be formed by at least one of coating or filling. The cathode material may include a cathode active material, a cathode conductive agent and a binder. The type of the cathode current collector is already well known to those skilled in the art, and for example, may be selected from an aluminum foil, a copper foil, or a punched steel strip. The type and content of the binder in the cathode material are well known to those skilled in the art, and the binder is, for example, one or more of fluorine-containing resin and polyolefin compounds such as polyvinylidene fluoride (PVDF), polytetrafluoroethylene (PTFE) and styrene-butadiene rubber (SBR). Generally speaking, depending on different types of binders used, the content of the binder based on the weight of the cathode active material is 0.01-10 wt %, for example, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.12 wt %, 0.14 wt %, 0.16 wt %, 0.18 wt %, 0.2 wt %, 0.25 wt %, 0.3 wt %, 0.35 wt %, 0.4 wt %, 0.45 wt %, 0.5 wt %, 0.55 wt %, 0.6 wt %, 0.65 wt %, 0.7 wt %, 0.75 wt %, 0.8 wt %, 0.85 wt %, 0.9 wt %, 1.0 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, or 10 wt %. In some other embodiments, the content of the binder based on the weight of the cathode active material is 0.02-5 wt %. The cathode active material is not particularly limited in the present disclosure, and may be a common active material in the art, for example, one or more of lithium cobaltate, lithium nickelate, lithium iron phosphate, or lithium manganate. The cathode conductive agent is not particularly limited in the present disclosure, and may be a cathode conductive agent conventionally known in the art, for example, at least one of acetylene black, conductive carbon black, or conductive graphite. Based on the weight of the cathode active material, the content of the cathode conductive agent is 0.5-15 wt %, for example, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, 10 wt %, 10.5 wt %, 11 wt %, 11.5 wt %, 12 wt %, 12.5 wt %, 13 wt %, 13.5 wt %, 14 wt %, 14.5 wt %, or 15 wt %. In some other embodiments, based on the weight of the cathode active material, the content of the cathode conductive agent is 1-10 wt %.

According to the present disclosure, the separator may be disposed between the cathode and the anode and has electrical insulation properties and liquid retention properties. The separator may be selected from various separators used in lithium-ion batteries, such as a polyolefin microporous film, polyethylene felt, glass fiber felt, or ultrafine glass fiber paper. The position, properties and type of the separator are well known to those skilled in the art.

According to the present disclosure, the electrolytic solution may be a mixed solution of a lithium salt electrolyte and a non-aqueous solvent, is not particularly limited herein, and may be a non-aqueous electrolytic solution conventionally known in the art. For example, the lithium salt electrolyte is one or more selected from lithium hexafluorophosphate (LiPF$_6$), lithium perchlorate, lithium tetrafluoroborate, lithium hexafluoroarsenate, lithium halide, lithium tetrachloroaluminate, or lithium fluoroalkylsulfonate. The organic solvent is a mixed solution of a chain acid ester and a cyclic acid ester. The chain acid ester may be at least one of dimethyl carbonate (DMC), diethyl carbonate (DEC), ethyl methyl carbonate (EMC), methyl propyl carbonate, (MPC), dipropyl carbonate (DPC) and other chain organic esters containing fluorine, sulfur or unsaturated bonds. The cyclic acid ester may be at least one of ethylene carbonate (EC), propylene carbonate (PC), vinylene carbonate (VC), γ-butyrolactone (γ-BL), sultone and other cyclic organic esters containing fluorine, sulfur or unsaturated bonds. The injection volume of the electrolytic solution is generally 1.5-4.9 g/Ah, and the concentration of the electrolytic solution is generally 0.1-2.0 mol/L.

The following describes the present disclosure with reference to specific embodiments. It should be noted that, these embodiments are merely descriptive, and do not limit the present disclosure in any manner.

In the following examples, asphalt was purchased from Dalian Mingqiang Chemical Co., Ltd., nano silicon particles were purchased from Zhejiang Zhongning Silicon Industry Co., Ltd., natural graphite was purchased from Qingdao Pingdu Huachen Graphite Products Co., Ltd., and carbon disulfide was purchased from Sinopharm Chemical Reagent Co., Ltd.

Example 1

3 g of pitch and 1 g of 30 nm nano silicon particles were added into a carbon disulfide solvent and then ball-milled on a ball mill at a rotating speed of 400 r/min for 24 hours. Then 10 g of natural graphite (with a particle size of 17 μm) was added to the ball-milled product and then ball-milled at a rotating speed of 250 r/min for 10 hours. The ball-milled product was put into an oven and dried at 80° C. The dried product was calcined in a high-temperature inert atmosphere furnace under an argon inert atmosphere at 980° C. for 8 hours to obtain a silicon-carbon material. A layer of lithium metal was deposited on the surface of the silicon-carbon material in a vacuum evaporation equipment, where the ratio of the weight of graphite to the weight of lithium metal deposited was 1:0.05. A core-shell structured anode material of this embodiment was obtained. The particle size parameter of the anode material is listed in Table 1 below.

After the prepared lithium metal/silicon-carbon composite material, super P, and PVDF were mixed at a weight ratio of 8:1:1, the slurry was coated (in a dry room). By using a lithium metal sheet as a counter electrode, a celgard2400 porous polypropylene film as the separator, and 1 mol/L mixed solution of LiPF$_6$ in ethylene carbonate and dimethyl carbonate (at a weight ratio of 1:1) as the electrolytic solution, a button cell S1 was prepared.

Example 2

3 g of pitch and 3 g of 30 nm nano silicon particles were added into a carbon disulfide solvent and then ball-milled on a ball mill at a rotating speed of 400 r/min for 24 hours. Then 10 g of natural graphite (with a particle size of 17 μm) was added to the ball-milled product and then ball-milled at a rotating speed of 250 r/min for 10 hours. The ball-milled product was put into an oven and dried at 80° C. The dried product was calcined in a high-temperature inert atmosphere furnace under an argon inert atmosphere at 1080° C. for 8 hours to obtain a silicon-carbon material. A layer of lithium metal was deposited on the surface of the silicon-carbon material in a vacuum evaporation equipment, where the ratio of the weight of graphite to the weight of lithium metal deposited was 1:0.05. A button cell S2 was prepared.

Example 3

3 g of pitch and 1 g of 30 nm nano silicon particles were added into a carbon disulfide solvent and then ball-milled on a planetary ball mill at a rotating speed of 400 r/min for 24 hours. Then 10 g of natural graphite (with a particle size of 17 μm) was added to the ball-milled product and then ball-milled at a rotating speed of 250 r/min for 10 hours. The ball-milled product was put into an oven and dried at 80° C. The dried product was calcined in a high-temperature inert atmosphere furnace under an argon inert atmosphere at 1080° C. for 8 hours to obtain a silicon-carbon material. A layer of lithium metal was deposited on the surface of the silicon-carbon material in a vacuum evaporation equipment, where the ratio of the weight of graphite to the weight of lithium metal deposited was 1:0.15. A button cell S3 was prepared.

Example 4

3 g of pitch and 0.1 g of 30 nm nano silicon particles were added into a carbon disulfide solvent and then ball-milled on a planetary ball mill at a rotating speed of 400 r/min for 24 hours. Then 10 g of natural graphite (with a particle size of 17 μm) was added to the ball-milled product and then ball-milled at a rotating speed of 250 r/min for 10 hours. The ball-milled product was put into an oven and dried at 80° C. The dried product was calcined in a high-temperature inert atmosphere furnace under an argon inert atmosphere at 1080° C. for 8 hours to obtain a silicon-carbon material. A layer of lithium metal was deposited on the surface of the silicon-carbon material in a vacuum evaporation equipment, where the ratio of the weight of graphite to the weight of lithium metal deposited was 1:0.05. $Al_2O_3$ was uniformly deposited on the surface of the lithium metal/silicon-carbon composite material using ALD equipment to form a final material, where the weight ratio of $Al_2O_3$ to graphite was 0.005:1. A button cell S4 was prepared.

Example 5

3 g of pitch and 0.1 g of 30 nm nano silicon particles were added into a carbon disulfide solvent and then ball-milled on a planetary ball mill at a rotating speed of 400 r/min for 24 hours. Then 10 g of natural graphite (with a particle size of 17 μm) was added to the ball-milled product and then ball-milled at a rotating speed of 250 r/min for 10 hours. The ball-milled product was put into an oven and dried at 80° C. The dried product was calcined in a high-temperature inert atmosphere furnace under an argon inert atmosphere at 1080° C. for 8 hours to obtain a silicon-carbon material. A layer of lithium metal was deposited on the surface of the silicon-carbon material in a vacuum evaporation equipment, where the ratio of the weight of graphite to the weight of lithium metal deposited was 1:0.05. $TiO_2$ was uniformly deposited on the surface of the lithium metal/silicon-carbon composite material using ALD equipment to form a final material, where the weight ratio of $TiO_2$ to graphite was 0.005:1. A button cell S5 was prepared.

Example 6

3 g of pitch and 2 g of 100 nm nano silicon particles were added into a diethylene glycol solvent and then ball-milled on a planetary ball mill at a rotating speed of 600 r/min for 60 hours. Then 10 g of natural graphite (with a particle size of 25 μm) was added to the ball-milled product and then ball-milled at a rotating speed of 400 r/min for 18 hours. The ball-milled product was put into an oven and dried at 100° C. The dried product was calcined in a high-temperature inert atmosphere furnace under an argon inert atmosphere at 950° C. for 10 hours to obtain a silicon-carbon material. A layer of lithium metal was deposited on the surface of the silicon-carbon material in a vacuum evaporation equipment, where the ratio of the weight of graphite to the weight of lithium metal deposited was 1:0.2. $Al_2O_3$ was uniformly deposited on the surface of the lithium metal/silicon-carbon composite material using ALD equipment to form a final material, where the weight ratio of $Al_2O_3$ to graphite was 0.005:1. A button cell S6 was prepared.

Example 7

0.3 g of pitch and 0.2 g of 80 nm nano silicon particles were added into a carbon tetrachloride solvent and then ball-milled on a planetary ball mill at a rotating speed of 150 r/min for 12 hours. Then 10 g of natural graphite (with a particle size of 5 μm) was added to the ball-milled product and then ball-milled at a rotating speed of 150 r/min for 3 hours. The ball-milled product was put into an oven and dried at 100° C. The dried product was calcined in a high-temperature inert atmosphere furnace under an argon inert atmosphere at 650° C. for 5 hours to obtain a silicon-carbon material. A layer of lithium metal was deposited on the surface of the silicon-carbon material in a vacuum evaporation equipment, where the ratio of the weight of graphite to the weight of lithium metal deposited was 1:0.01. A core-shell structured material S7 of this embodiment was obtained.

Comparative Example 1

2 g of lithium silicon alloy powder with a particle size of 1000 nm (where lithium metal was 44 wt %) and 10 g of polyacrylonitrile were dissolved in 100 mL of dimethylformamide solvent and ultrasonically dispersed to obtain a dispersion slurry. The dispersion slurry was spray dried in a vacuum environment at 80° C., then calcined under an inert atmosphere at 800° C. for 6 hours, and cooled to obtain a final material. A button battery DS1 was prepared.

Comparative Example 2

By using artificial graphite with a specific capacity of 350 mAh/g as the working electrode and a lithium metal sheet as the counter electrode, a button cell DS2 was prepared.

Comparative Example 3

This comparative example adopted the method and raw materials of Example 1 except that the step of depositing lithium metal is not included. That is, the silicon-carbon material obtained after calcination in Example 1 was used as the anode material to prepare a button cell DS3.

Comparative Example 4

This comparative example adopted the method and raw materials of Example 1 except that lithium metal was directly deposited on the surface of the graphite particles by vacuum evaporation deposition to obtain the anode material, based on which a button cell DS4 was prepared.

TABLE 1

| Item | Particle size of core-shell material obtained by adding up core material and inner shell material (μm) | Particle size of core-shell material obtained by adding up core material, inner shell material, and outer shell material (μm) |
| --- | --- | --- |
| Example 1 | 19.5 | 23.2 |
| Example 2 | 19.3 | 22.7 |
| Example 3 | 20.4 | 28.6 |
| Example 4 | 21.7 | 24.9 |
| Example 5 | 21.9 | 25.8 |
| Example 6 | 32 | 34.5 |
| Example 7 | 5.6 | 5.9 |
| Comparative Example 1 | 2.5 (calcined particles) | NA |
| Comparative Example 2 | 17.0 (artificial graphite) | NA |
| Comparative Example 3 | 19.2 | NA |
| Comparative Example 4 | 18.6 | 22.4 |

TABLE 1-continued

| Item | Particle size of core-shell material obtained by adding up core material and inner shell material (μm) | Particle size of core-shell material obtained by adding up core material, inner shell material, and outer shell material (μm) |
| --- | --- | --- |
| Example 4 | (graphite particles + lithium metal outer shell) | |

Test Example 1

The batteries S1-S5 and the batteries DS1-DS4 were tested for the charge and discharge performance at 25° C. The first lithium intercalation was carried out using a constant current method, and the lithium intercalation was carried out by charging at a current of 0.15 mA/cm². The lithium intercalation time was fixed based on the specific capacity of the material. The first lithium deintercalation was carried out using a three-stage constant current method: charging at a constant current of 0.15 mA/cm², with a cut-off potential of 1.5 V; charging at a constant current of 0.075 mA/cm², with a cut-off potential of 1.5 V; and charging at a constant current of 0.0375 mA/cm², with a cut-off potential of 1.5 V. The test results are as shown in Table 2.

Test Example 2

The batteries S1-S5 and the batteries DS1-DS4 were tested for the cycle performance at 25° C. The charge and discharge cycle test was carried out according to the specific capacity after the first lithium intercalation. The discharge is carried out using a constant current method: discharging at a constant current of 0.3 mA/cm², where the discharge time (h)=specific capacity after the first lithium intercalation/0.3. The charging was carried out using a three-stage constant current method: charging at a constant current of 0.3 mA/cm², with a cut-off potential of 1.5 V; charging at a constant current of 0.15 mA/cm², with a cut-off potential of 1.5 V; and charging at a constant current of 0.075 mA/cm², with a cut-off potential of 1.5 V. The cycle was repeated 100 times. The capacity retention rate after 100 cycles is the ratio of the specific capacity after the 100th lithium deintercalation (charging) to the specific capacity after the first lithium deintercalation. The test results are as shown in Table 2.

TABLE 2

| Experiments | Sample No. | Theoretical specific capacity (mAh/g) | Specific capacity after first lithium intercalation (mAh/g) | Specific capacity after first lithium deintercalation (mAh/g) | Cycle discharge time (h) | Cycle charge specific capacity (mAh/g) | Capacity retention rate after 100 cycles |
| --- | --- | --- | --- | --- | --- | --- | --- |
| Example 1 | S1 | 733 | 564 | 723 | 8 | 572 | 85.7% |
| Example 2 | S2 | 1254 | 1108 | 1248 | 13.8 | 980 | 80.4% |
| Example 3 | S3 | 983 | 524 | 967 | 10.7 | 766 | 76.8% |
| Example 4 | S4 | 700 | 531 | 683 | 7.5 | 542 | 90.3% |
| Example 5 | S5 | 695 | 526 | 682 | 7.4 | 536 | 92.5% |
| Example 6 | S6 | 1258 | 524 | 930 | 15.2 | 850 | 83.7% |
| Example 7 | S7 | 435 | 398 | 410 | 5.35 | 400 | 95.3% |
| Comparative Example 1 | DS1 | 640 | 396 | 607 | 6.7 | 480 | 30.5% |
| Comparative Example 2 | DS2 | 350 | 402 | 388 | 4.3 | 306 | 0 (short circuit) |
| Comparative Example 3 | DS3 | 700 | 635 | 572 | 8 | 480 | 80% |
| Comparative Example 4 | DS4 | 517 | 330 | 510 | 6 | 450 | Battery short circuit |

According to the data in Table 2, compared with lithium-silicon alloy powder anode material (Comparative Example 2) or artificial graphite anode material (Comparative Example 1), the lithium-ion battery anode material of the present disclosure has a higher theoretical specific capacity, higher specific capacity after the first lithium intercalation, higher specific capacity after the first lithium deintercalation and higher specific capacity after cyclic charging, and can achieve better battery cycle performance. Compared with an anode material not having an inner shell containing nano silicon and carbon (Comparative Example 4) or an anode material not having a lithium metal outer shell (Comparative Example 3), the lithium-ion battery anode material of the present disclosure has a higher theoretical specific capacity and specific capacity after cyclic charging, and can achieve better battery cycle performance, indicating that the anode material having the inner shell where the continuous phase is carbon and the dispersing phase is nano silicon and graphite particles wrapped by the lithium metal outer shell has more excellent specific capacity and cycle performance, which facilitates increasing the electrode capacity and prolong the battery life.

Test Example 3

Figure 1:
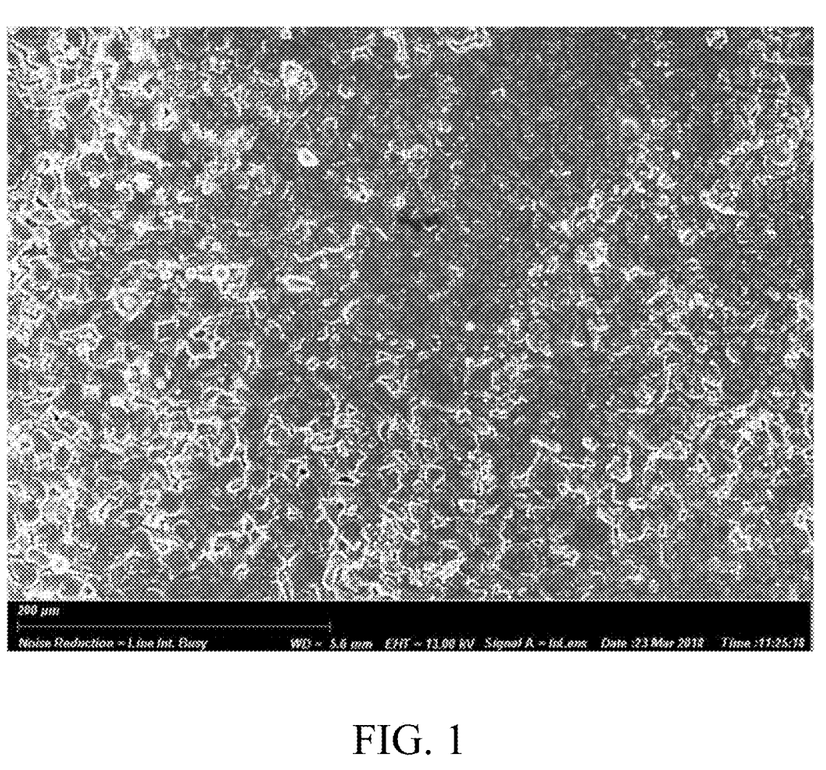
FIG. 1 shows a surface morphology of a working electrode in a lithium-ion battery after 100 cycles according to an embodiment of the present disclosure.

The lithium-ion battery of Example 4 was disassembled after 100 cycles. The surface morphology of the working electrode was scanned by SEM (company: OXFORD instrument; model: Zeiss). The result is as shown in FIG. 1. It can be seen that after 100 cycles, no obvious lithium dendrite was observed on the surface of the anode material.

Figure 2:
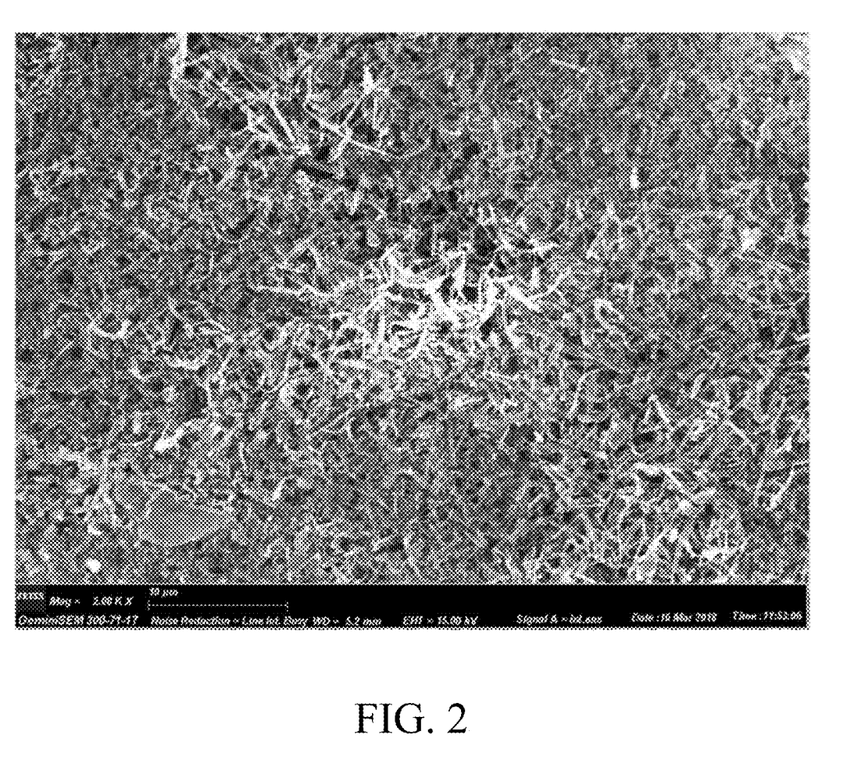
FIG. 2 shows the surface morphology of the working electrode in the lithium-ion battery after 15 cycles according to an embodiment of the present disclosure.

The lithium-ion battery of Comparative Example 2 was disassembled after 15 cycles. The surface morphology of the working electrode was scanned by SEM (company: OXFORD instrument; model: Zeiss). The result is as shown in FIG. 2. It can be seen that after 15 cycles, a large number of dendrites were formed on the graphite surface, leading to a short circuit of the battery, resulting in that no more cycles are allowed.

Some implementations of the present disclosure are described above in detail. However, the present disclosure is not limited to the specific details in the foregoing implementations, various simple variations may be made to the technical solutions of the present disclosure within the scope of the technical idea of the present disclosure, and such simple variations shall fall within the protection scope of the disclosure.

It should be further noted that the specific technical features described in the above specific implementations may be combined in any suitable manner without contradiction. To avoid unnecessary repetition, various possible combinations are not further described in the present disclosure.

In addition, the various implementations of the present disclosure may be combined without departing from the idea of the present disclosure, and such combinations shall also be regarded as content disclosed in the present disclosure.

In the description of the specification, the description with reference to the terms "an embodiment", "some embodiments", "example", "specific example", or "some example" and so on means that specific features, structures, materials or characteristics described in connection with the embodiment or example are embraced in at least one embodiment or example of the present disclosure. In the present specification, the illustrative expression of the above terms is not necessarily referring to the same embodiment or example. Moreover, the described specific features, structures, materials or characteristics may be combined in any suitable manners in one or more embodiments. In addition, where there are no contradictions, the various embodiments or examples described in this specification and features of various embodiments or examples can be combined by those skilled in the art.

Although the embodiments of the present disclosure have been illustrated and described above, it should be understood that the above embodiments are exemplary and not to be construed as limiting the disclosure, and that changes, modifications, substitutions and alterations can be made by those skilled in the art without departing from the scope of the disclosure.

What is claimed is:

1. A lithium-ion battery anode material, comprising:
a core-shell structured composite material, comprising:
a core material, an inner shell material, and an outer shell material, wherein:
the core material comprises graphite particles; and
the inner shell material comprises a continuous phase and a dispersing phase, wherein:
the dispersing phase comprises nano silicon-based particles,
wherein a chemical formula of the nano silicon-based particles is SiOx, 0<x<2; and
the continuous phase comprises carbon; and
the outer shell material comprises lithium metal, wherein:
an inner shell thickness of the core-shell structured composite material is 0.5 µm-2 µm; and
an outer shell thickness of the core-shell structured composite material is 0.1 µm-5 µm.

2. The anode material according to claim 1, wherein an average particle size of the core-shell structured composite material is 5.6 µm-32 µm.

3. The anode material according to claim 1, wherein:
the inner shell thickness of the core-shell structured composite material is 1 µm-1.5 µm; and
the outer shell thickness of the core-shell structured composite material is 1 µm-2 µm.

4. The anode material according to claim 1, wherein:
an average particle size of the graphite particles is 5 µm-25 µm; and
an average particle size of the nano silicon particles is 10 nm-100 nm.

5. The anode material according to claim 4, wherein:
the average particle size of the graphite particles is 15 µm-20 µm; and
the average particle size of the nano silicon particles is 30 nm-50 nm.

6. A lithium-ion battery anode material comprising:
a core-shell structured composite material, comprising:
a core material, an inner shell material, and an outer shell material, wherein:
the core material comprises graphite particles; and
the inner shell material comprises a continuous phase and a dispersing phase, wherein:
the dispersing phase comprises nano silicon-based particles,
wherein a chemical formula of the nano silicon-based particles is SiOx, 0<x<2; and
the continuous phase comprises carbon; and
the outer shell material comprises lithium metal, wherein:
a weight ratio of the graphite particles to the nano silicon particles is 1:(0.02-0.2);
a weight ratio of the graphite particles to the carbon is 1:(0.03-0.3); and
a weight ratio of the graphite particles to the lithium metal is 1:(0.01-0.2).

7. The anode material according to claim 6, wherein:
the weight ratio of the graphite particles to the nano silicon particles is 1:(0.1-0.15);
the weight ratio of the graphite particles to the carbon is 1:(0.1-0.15); and
the weight ratio of the graphite particles to the lithium metal is 1:(0.01-0.2).

8. The anode material according to claim 1, wherein the carbon in the inner shell material is pyrolytic carbon.

9. The anode material according to claim 1, wherein the core-shell structured composite material further comprises:
an inert material layer coated on the surface of the outer shell material,
wherein a material of the inert material layer comprises at least one of: $Al_2O_3$, LiF, $Li_3PO_4$, $TiO_2$, $Li_3N$ or $LiNO_3$.

10. A lithium-ion battery, comprising a lithium-ion battery anode, the lithium-ion battery anode comprises:
a lithium-ion battery anode material, comprising:
a core-shell structured composite material, comprising:
a core material, an inner shell material, and an outer shell material, wherein:
the core material comprises graphite particles;

the inner shell material comprises:
  a continuous phase, and
  a dispersing phase, wherein:
    the dispersing phase comprises nano silicon-based particles,
    wherein a chemical formula of the nano silicon-based particles is SiOx, 0<x<2; and
    the continuous phase comprises carbon; and
the outer shell material comprises lithium metal, wherein:
an inner shell thickness of the core-shell structured composite material is 0.5 μm-2 μm; and
an outer shell thickness of the core-shell structured composite material is 0.1 μm-5 μm.

* * * * *